(No Model.)
C. C. THOMPSON.
BED PAN.
No. 322,503.                   Patented July 21, 1885.
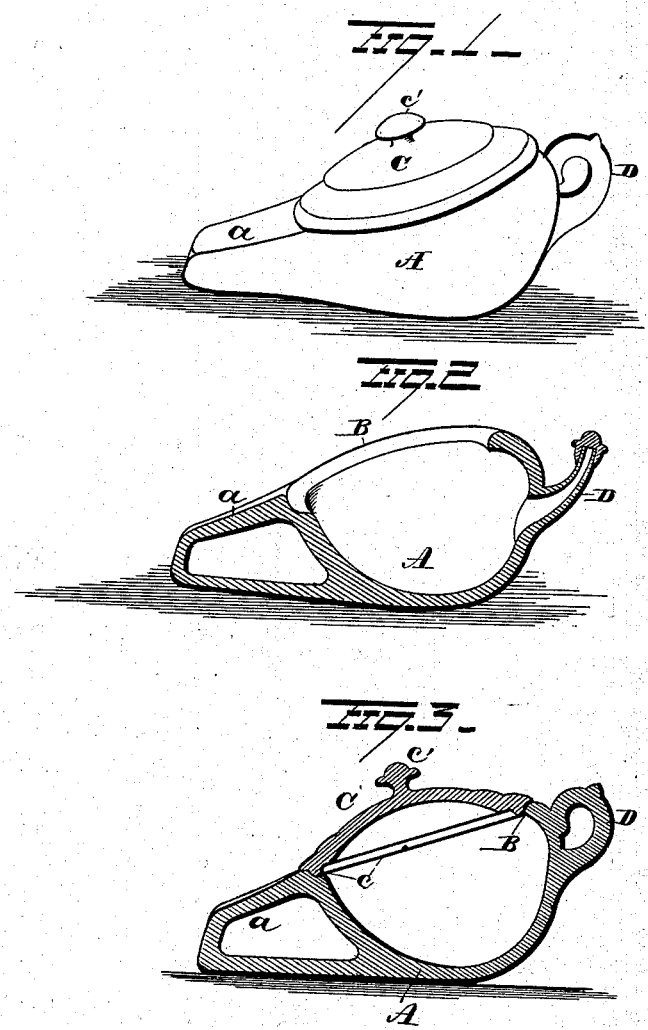
WITNESSES
S. G. Nottingham
Wm. H. Ruff
INVENTOR
Cassius C. Thompson.
By Leggett & Leggett
ATTORNEY

UNITED STATES PATENT OFFICE.

CASSIUS C. THOMPSON, OF EAST LIVERPOOL, OHIO.

BED-PAN.

SPECIFICATION forming part of Letters Patent No. 322,503, dated July 21, 1885.

Application filed December 19, 1884. (No model.)

*To all whom it may concern:*

Be it known that I, CASSIUS C. THOMPSON, of East Liverpool, in the county of Columbiana and State of Ohio, have invented certain new and useful Improvements in Bed-Pans; and I do hereby declare the following to be a full, clear, and exact description of the invention, such as will enable others skilled in the art to which it appertains to make and use the same.

My invention relates to an improvement in bed-pans. Hitherto it has been customary to construct bed-pans without covers and provide them with an emptying-spout at the elevated end. It has consequently been necessary to remove the pans after use from the room, and in ordinary country houses from the house, or allow the contents to contaminate the air of the room in which the pan was left. This necessity of removal often becomes a troublesome matter, especially in cold or stormy weather and during the night, while the awkward arrangement for emptying the pan, as hitherto constructed, requiring the person handling it to take hold of the body of the pan and nearly invert the same, taken in connection with the odor often arising during such emptying, has rendered the transfer of the contents in the room undesirable.

The object of my present invention is to provide a bed-pan of the most convenient and useful shape which shall have a cover adapted to fit closely thereon, and thereby obviate the necessity of the removal of the pan or transfer of the contents until such time as found convenient, a further object being to provide a bed-pan which shall be light, durable, comely in appearance, and convenient for handling and emptying; and with these ends in view my invention consists in certain features of construction and combinations of parts, as will hereinafter be described, and pointed out in the claims.

In the accompanying drawings, Figure 1 is a view of the bed-pan with cover in position; Fig. 2, the same with cover removed, showing modified form of handle; and Fig. 3, a vertical longitudinal section.

A is the main body of the pan, terminating forwardly in the flat duck-bill-shaped projection a, the upper surface of the latter being slightly concave in cross-section. The bottom of the pan is flat, and the top gradually increases in height from the end of the bill a to the rear end. The top of the pan is provided with the oval or circular opening B. All parts of the rim about the opening B lie in the same incline plane, and the rim forms a seat for the under face of the rim of the cover C. The latter is provided with a depending flange, c, adapted to fit within the opening B, and with a knob, c', for handling it, as is usual in covers for chamber-vessels. The shape of the pan A between the opening B and its base is preferably curved as shown in order that it may not offer any angular resistance in placing it in position for use or removing it therefrom, and the chamber beneath the opening B does not cut under the rim of the opening on the lower side, whereby the pan may be readily emptied by tilting it up on the end of the bill a, the contents flowing naturally down the concave face of the bill. For the purpose of lightness, the bill portion forward of the main chamber is formed hollow, as shown in the sectional view in Fig. 3. The pan is also provided with a handle, D, secured to its rear end, and is of such shape and size as to naturally receive the hand of the operator. I prefer to attach this handle outside of the pan and empty the pan as hereinbefore described; but I may find it desirable to construct the handle hollow and cause it to communicate with the main chamber, forming a spout as well as a handle, and cover the outer end thereof with a tightly-fitting cap, as shown in Fig. 2. It is also evident that the rim which forms the seat for the cover might occupy a horizontal instead of an inclined plane, and that it might be formed with an irregular face, the cover being made to correspond thereto, and other slight changes might be made in the construction without departing from the spirit and scope of my invention; hence I do not wish to limit myself strictly to the construction herein set forth; but, Having fully described my invention, what I claim as new, and desire to secure by Letters Patent, is—

1. A bed-pan consisting, essentially, of a body, a forwardly-extending projection, the latter being formed tapering in cross-section and forming an extended support for the body, a chamber located wholly within the body, and a separable or removable cover, substantially as set forth.

2. As a new article of manufacture, a bed-pan having a forwardly-extending projection, the latter forming an extended support for the body, and having its upper surface formed concave from side to side, a chamber located wholly within the main body of the pan, and a removable cover, substantially as set forth.

In testimony whereof I have signed this specification in the presence of two subscribing witnesses.

CASSIUS C. THOMPSON.

Witnesses:
JNO. J. PURINTON, Jr.,
JAS. M. SMITH.